United States Patent
Matsumoto

(12) 
(10) Patent No.: US 6,196,794 B1
(45) Date of Patent: Mar. 6, 2001

(54) GAS TURBINE STATOR VANE STRUCTURE AND UNIT FOR CONSTITUTING SAME

(75) Inventor: Keizo Matsumoto, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/286,417

(22) Filed: Apr. 6, 1999

(30) Foreign Application Priority Data

Apr. 8, 1998 (JP) .................................................. 10-096029
Mar. 26, 1999 (JP) .................................................. 11-083657

(51) Int. Cl.$^7$ ....................................................... F01D 1/02
(52) U.S. Cl. ........................ 415/191; 415/200; 415/208.2; 415/209.4; 415/210.1; 416/299 A; 416/230; 416/241 A
(58) Field of Search ..................................... 415/191, 192, 415/200, 208.1, 208.2, 209.2, 209.3, 209.4, 210.1; 416/229 A, 230, 241 R, 241 A

(56) References Cited

U.S. PATENT DOCUMENTS

| 3,572,971 | * | 3/1971 | Seiwert | 416/230 |
| 4,786,347 | | 11/1988 | Angus . | |
| 5,292,231 | * | 3/1994 | Lauzeille | 416/229 A |
| 5,494,404 | | 2/1996 | Furseth et al. . | |
| 5,547,342 | * | 8/1996 | Furseth et al. | 415/200 |
| 5,961,288 | * | 10/1999 | Lagendre et al. | 416/134 A |

FOREIGN PATENT DOCUMENTS 5-278063   10/1993   (JP) .

OTHER PUBLICATIONS

Abridged Translation, Ishikawajima Harima Technical Report, vol. 33, No. 6, pp. 382–389 (Nov. 1993).
Copy of Abridged Translation, Ishikawajima Harima Technical Report, vol. 33, No. 6, pp. 382–389 (Nov. 1993).

* cited by examiner

*Primary Examiner*—Edward K. Look
*Assistant Examiner*—Ninh Nguyen
(74) *Attorney, Agent, or Firm*—Sughrue, Mion, Zinn, Macpeak & Seas, PLLC

(57) ABSTRACT

The gas turbine stator vane structure comprising a plurality of vanes 13, an outer platform 11 and an inner platform 12 is formed by integrally connecting a plurality of units 2 in a circle with fiber-reinforced prepreg tapes 10, 10' each wound around and fused to an outside surface of the outer platform 11 and an inside surface of the inner platform 12. Each of the units 2 is constituted by (a) a core 3 composed of a laminate of fiber-reinforced prepregs and integrally having a web 31 for constituting a vane 13, and flanges 32, 33 integrally connected to both ends of the web 31 for constituting outer and inner platform pieces 21, 22; and (b) a skin layer 4 integrally molded around the core 3. The core 3 is at least partially exposed through windows of the skin layer 4 on both of an outside surface of the outer platform piece 21 and an inside surface of the inner platform piece 22, and fused to the fiber-reinforced prepreg tapes 10, 10'.

11 Claims, 5 Drawing Sheets

GAS TURBINE STATOR VANE STRUCTURE AND UNIT FOR CONSTITUTING SAME

BACKGROUND OF THE INVENTION

The present invention relates to a unit integrally formed of a fiber-reinforced resin, and a gas turbine stator vane structure constituted by a plurality of such units, particularly to a unit of I-shape, C-shape, etc., constituted by a fiber-reinforced core and a resin skin layer integrally molded therewith, and a gas turbine stator vane structure produced by connecting such units in a circle.

Gas turbine engines have been widely utilized for airplanes, generators of electricity, etc., because they have not only large output capacity, but also superior efficiency. Stator vanes are generally installed in a gas turbine airplane-engine to lead inhaled air into moving vanes and to rectify by-pass flow as guide vanes. The stator vanes have been generally made of metal materials such as titanium alloys, aluminum alloys, stainless steel, etc. The metal stator vane structure has been produced by forming the vanes by casting, forging, pressing, etc., and connecting the vanes to circular cases called platforms, by welding, brazing, etc.

However, the conventional metal stator vanes need machining, finishing, coating, etc., after formation, suffering disadvantages that they are completed through many working processes, some of which are extremely difficult in conducting in complicated structures, and that they are heavy and expensive because of using metal materials.

In such circumstance, the production of stator vanes composed of resins or resin composite materials has recently attracted much attention, and some proposals have been made. For example, Japanese Patent Laid-Open No. 5-278063 discloses a method for producing a stator vane made of resins comprising the steps of forming a laminate of prepregs into a vane body, which is slightly smaller than the desired size of the vane; placing the vane body in a molding die having a cavity of the final vane shape; filling a gap between the vane body and the molding die cavity with a thermoplastic resin under pressure; and carrying out compression molding. Because this method utilizes resins as materials for stator vanes, it contributes not only to reduction in production time and the weight of stator vanes and thus their cost, but also to facilitation of production steps and improvement in dimensional accuracy, etc. However, the above method is disadvantageous in that the resin-made vanes have to be fixed to platforms using adhesives, bolts, etc., to form an integral stator vane structure, requiring many components and production steps.

OBJECT AND SUMMARY OF THE INVENTION

Accordingly, an object of the present invention is to provide a unit for constituting a gas turbine stator vane structure without adhesives, bolts, etc.

Another object of the present invention is to provide a gas turbine stator vane structure constituted by such units.

As a result of intense research in view of the above objects, the inventor has found that a gas turbine stator vane structure having high mechanical strength can be produced without difficulty by forming each unit of I-shape, C-shape, etc., by molding of a resin skin layer integrally with a core composed of a laminate of fiber-reinforced prepregs; assembling a plurality of units in a circle; and winding a fiber-reinforced prepreg tape around the resultant stator vane structure and fusing the fiber-reinforced prepreg tape thereto. The present invention has been completed based upon this finding.

The unit for constituting a gas turbine stator vane structure comprising a plurality of vanes, an outer platform and an inner platform according to the present invention comprises a vane and outer and inner platform pieces integral with the vane, the unit being constituted by (a) a core formed by a laminate of a plurality of fiber-reinforced prepregs and integrally having a web for constituting the vane, and flanges integrally connected to both ends of the web for constituting the outer and inner platform pieces; and (b) a skin layer integrally molded around the core.

The core is preferably composed of carbon fiber-reinforced polyetheretherketone. The unit preferably has steps for connecting with those of the adjacent units, at both circumferential ends of the outer and inner platform pieces, and the steps of the adjacent units have complementary shapes. The flanges of the core are formed by bending both ends of a laminate of fiber-reinforced prepregs.

In the first embodiment of the present invention, the flanges of the core are formed by splitting both ends of a laminate of fiber-reinforced prepregs into two parts and bending the split ends in opposite directions in a T-shape manner, thereby providing the core with a substantially I-shape. In the second embodiment, the flanges of the core are formed by bending both ends of a laminate of fiber-reinforced prepregs in one direction, thereby providing the core with a substantially C-shape.

The skin layer preferably has one or more windows on the outside of the outer platform piece and the inside of the inner platform piece for at least partially exposing the core.

A plurality of the units of the present invention are connected end to end in a circle. The fiber-reinforced prepreg tape is preferably wound around the outside surface of the outer platform and the inside surface of the inner platform, respectively, and fused thereto. The outside surface of the outer platform and the inside surface of the inner platform may be fixed by a support ring, if necessary.

The gas turbine stator vane structure formed by integrally connecting a plurality of the above units in a circle according to the present invention comprises a plurality of vanes, an outer platform and an inner platform, with fiber-reinforced prepreg tapes each being wound around and fused to an outside surface of the outer platform and an inside surface of the inner platform.

BRIEF DESCRIPTION OF THE DRAWING

FIG. 6 (*b*) is an enlarged, perspective view showing in detail a portion X of the C-shaped unit of FIG. 6 (*a*);

DETAILED DESCRIPTION OF THE PREFERRED EMBODIMENTS

Each unit for constituting a gas turbine stator vane structure according to the present invention is essentially constituted by a vane, and outer and inner platform pieces integral with the vane. Depending on the shapes of flanges integrally connected to both ends of the web constituting the vane, the unit may be classified to an I-shaped unit, a C-shaped unit, etc. Detailed explanations will be made with respect to the I-shaped unit, the C-shaped shaped unit, and gas turbine stator vane structures constituted by such units.

[1] I-shaped unit

Figure 1:
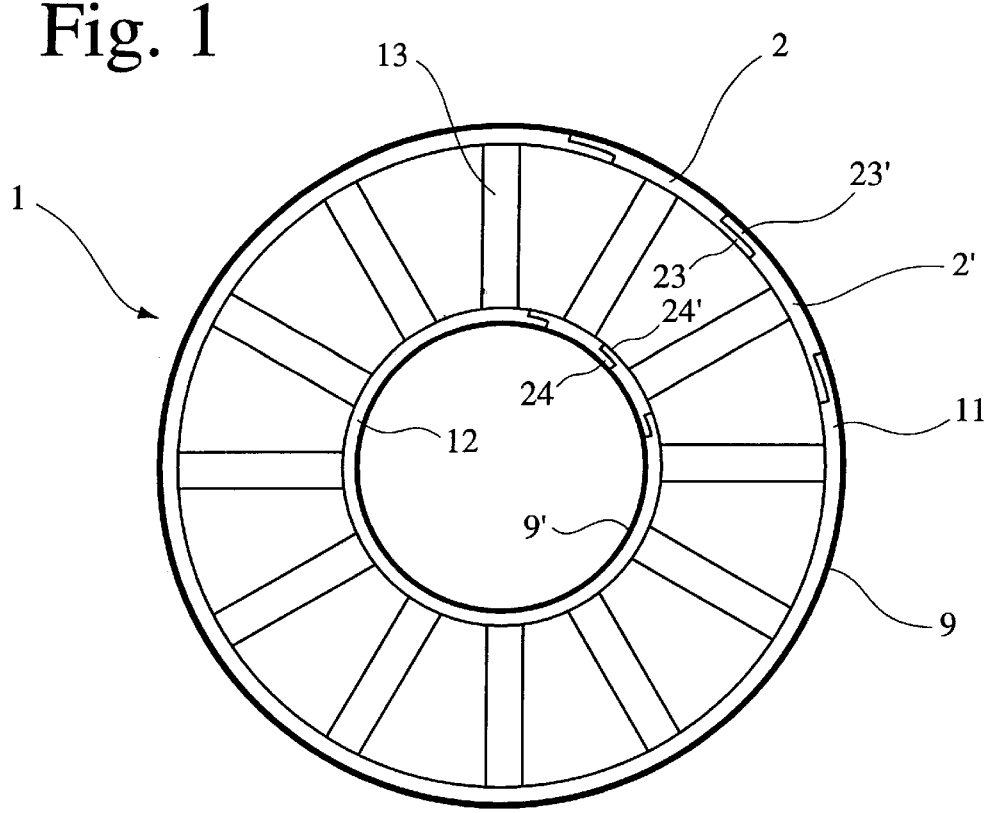
FIG. 1 is a front view showing an example of the gas turbine stator vane structure constituted by the I-shaped units of the present invention.
Figure 2:
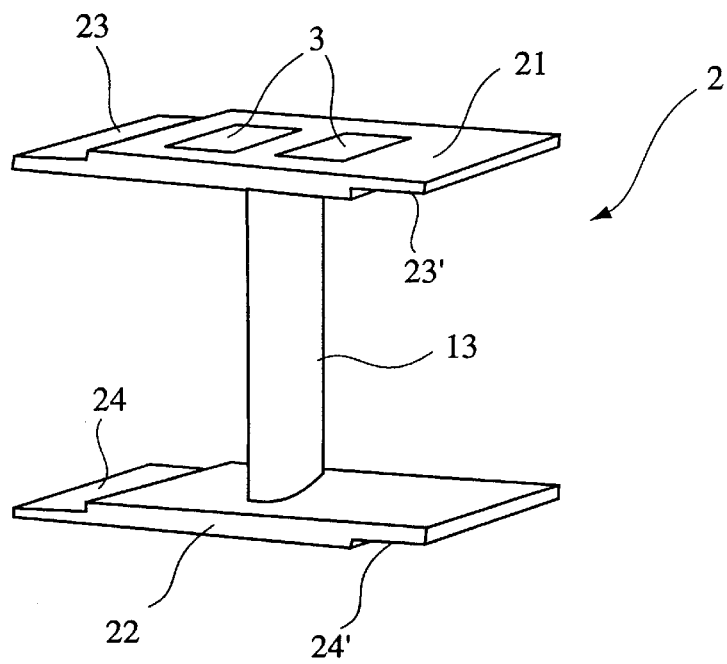
FIG. 2 is a schematic perspective view showing an example of the I-shaped unit of the present invention.

As shown in FIG. 1, a gas turbine stator vane structure 1 of the present invention comprises an outer platform 11, an inner platform 12 and a plurality of radially oriented vanes 13 integrally connected to both platforms 11 and 12 at circumferentially equal intervals. Each I-shaped unit 2 constituting the stator vane structure 1 has a shape obtained by dividing the stator vane structure 1 to a plurality of pieces each having one vane 13. As shown in FIG. 2, the unit 2 is a substantially I-shaped, integral molding comprising a vane 13, an outer platform piece 21 and an inner platform piece 22. Though both platform pieces 21 and 22 are depicted in a flat shape in FIG. 2, these pieces 21, 22 are actually arcuate.

The outer platform piece 21 is provided with steps 23, 23' at both circumferential ends thereof, and the inner platform piece 22 is provided with steps 24, 24' at both circumferential ends of. The steps 23, 23' are in a complementary shape to each other, and the steps 24, 24' are also in a complementary shape to each other. Thus, one step 23 of the I-shaped unit 2 fits another step 23' of the adjacent I-shaped unit 2' without leaving any irregularity on both inside and outside surfaces of the outer platform 11, and one step 24 of the I-shaped unit 2 fits another step 24' of the adjacent I-shaped unit 2' without leaving any irregularity on both inside and outside surfaces of the inner platform 12 as shown in FIG. 1.

Figure 3:
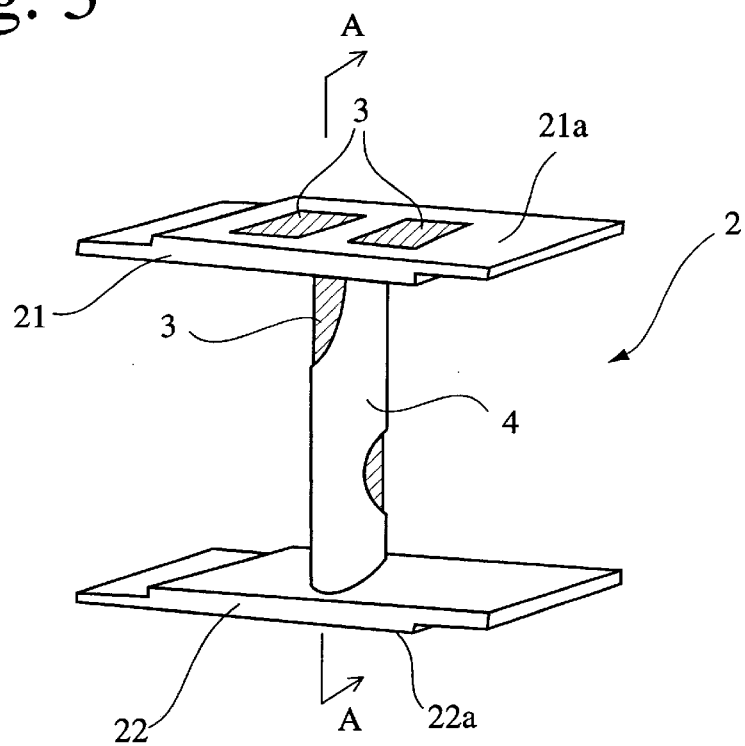
FIG. 3 is a partially broken, perspective view showing the structure of the I-shaped unit of the present invention.

As shown in FIG. 3, the I-shaped unit 2 comprises a substantially I-shaped core 3 composed of a laminate of fiber-reinforced prepregs and a skin layer 4 integrally molded around the core 3. The skin layer 4 preferably has windows for exposing the core 3 at least partially on both of an outside surface 21a of the outer platform piece 21 and an inside surface 22a of the inner platform piece 22. Though the skin layer 4 has a pair of rectangular windows on each side in this embodiment, this is not restrictive. The skin layer 4 may have one rectangular window on each side, and the window may be in any other shape.

The fiber-reinforced prepreg for constituting the I-shaped core 3 is in a sheet form composed of reinforcing fibers such as carbon fibers, aramide fibers, glass fibers, boron fibers, etc., impregnated with a matrix resin such as a thermoplastic resin. An average diameter of the reinforced fibers is preferably about 3–200 µm. The thermoplastic resins may be polyetheretherketones (PEEK), polyamides such as nylon, polyimides, polyesters such as polyethylene terephthalate and polybutylene terephthalate, polyacetals, polyphenylene sulfides, polyetherketones, etc. In view of mechanical strength and heat resistance, the combination of the carbon fibers and PEEK is particularly preferable. Commercially available carbon fiber-reinforced PEEK is APC-2 (available from CYTEC FIBERITE), etc.

Figure 4:
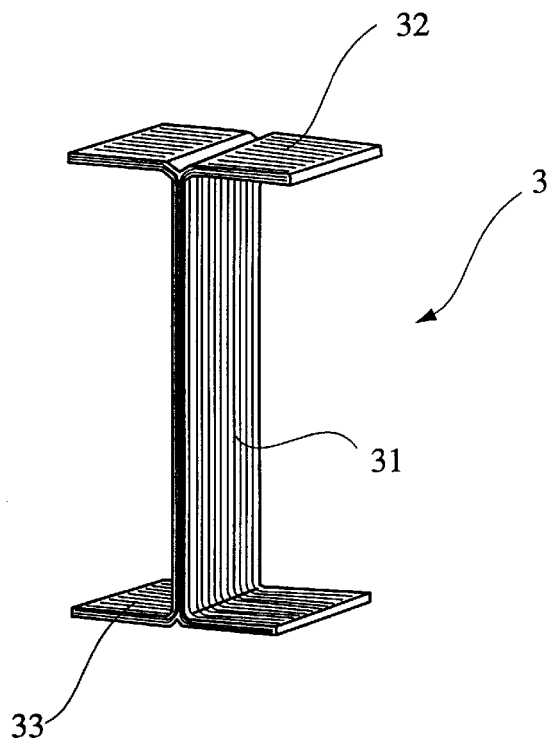
FIG. 4 is a perspective view showing an example of the I-shaped core in the I-shaped unit of the present invention.

As shown in FIG. 4, the I-shaped core 3 comprises a web 31 for constituting the vane 13, a flange 32 for constituting the outer platform piece 21 and a flange 33 for constituting the inner platform piece 22. The flanges 32 and 33 integral with the web 31 are formed by splitting both ends of a laminate of fiber-reinforced prepregs into half and bending the split ends to both outsides.

Figure 5:
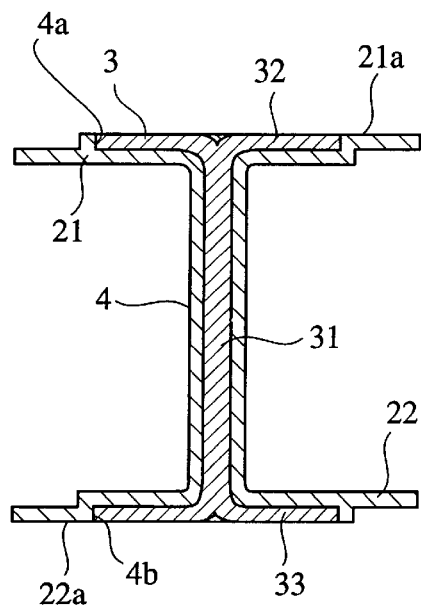
FIG. 5 is a cross-sectional view taken along the line A—A in FIG. 3.

As shown in FIG. 5, the I-shaped core 3 is preferably exposed at least partially through windows 4a, 4b of the skin layer 4 on the outside surface 21a and the inside surface 22a.

[2] C-Shaped Unit

Figure 6A:
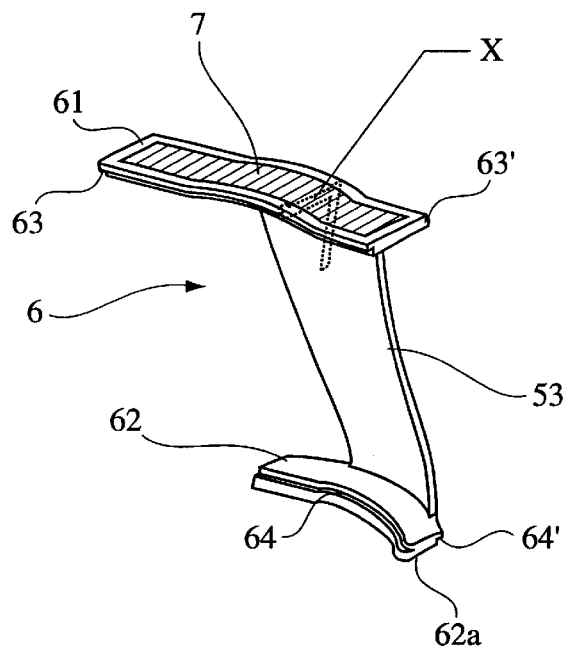
FIG. 6 (*a*) is a perspective view showing an example of the C-shaped unit of the present invention.
Figure 6B:
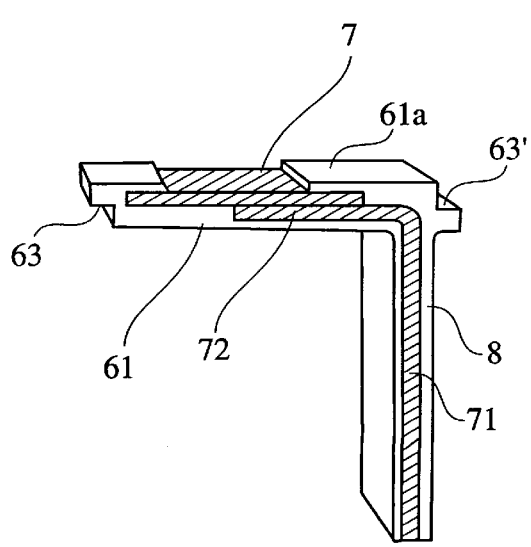
Figure 7:
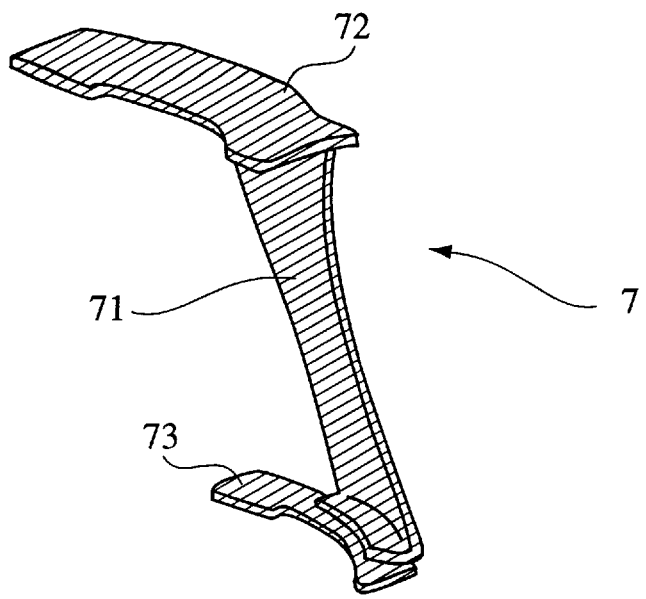
FIG. 7 is a perspective view showing an example of the C-shaped core in the C-shaped unit of the present invention.

FIG. 6 (a) shows a C-shaped unit 6 of the present invention, and FIG. 6 (b) shows in detail a portion X of the C-shaped unit 6 shown in FIG. 6 (a). The C-shaped unit 6 comprises a substantially C-shaped core 7 composed of a laminate of fiber-reinforced prepregs and a skin layer 8 integrally molded around the core 7. As shown in FIG. 7, the C-shaped core 7 comprises a web 71 for constituting the vane 13, a flange 72 for constituting the outer platform piece 61 and a flange 73 for constituting the inner platform piece 62. The flanges 72 and 73 integral with the web 71 are formed by bending both ends of the laminate of fiber-reinforced prepregs in one direction. As shown in FIG. 6(b), additional fiber-reinforced prepreg pieces may be bonded to the flanges 72 and 73.

As shown in FIG. 6, the C-shaped core 7 is preferably exposed at least partially through windows of the skin layer 8 on the outside surface 61a of the outer platform piece 61 and the inside surface 62a of the inner platform piece 62. Though part of the C-shaped core 7 exposed through each window of the skin layer 8 is in a rectangular shape in this embodiment, this is not restrictive, and it may be in any other shape.

Figure 8:
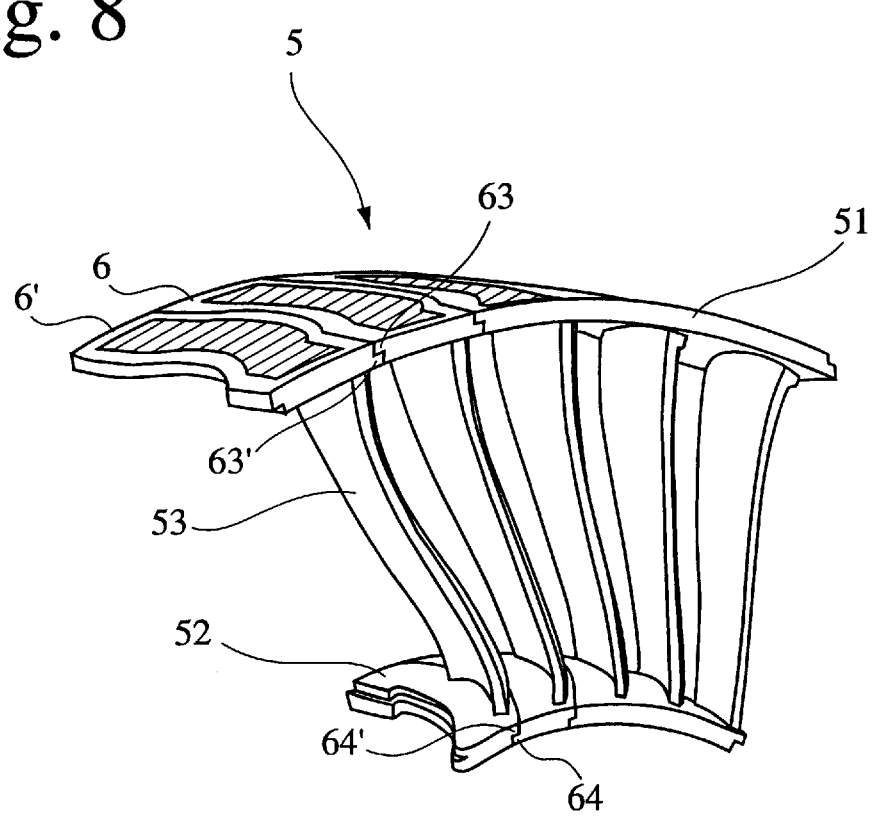
FIG. 8 is a perspective view showing a plurality of C-shaped units connected to each other according to the present invention.

Like the I-shaped unit 2, the outer platform piece 61 is provided with steps 63, 63' at both circumferential ends thereof, and the inner platform piece 62 is provided with steps 64, 64' at both circumferential ends thereof. The steps 63, 63' are in a complementary shape to each other, and the steps 64, 64' are also in a complementary shape to each other. Accordingly, one step 63 of the C-shaped unit 6 fits another step 63' of the adjacent C-shaped unit 6' without leaving any irregularity on both inside and outside surfaces of the outer platform 61, and one step 64 of the C-shaped unit 6 fits another step 64' of the adjacent C-shaped unit 6' without leaving any irregularity on both inside and outside surfaces of the inner platform 62 as shown in FIG. 8. Thus, the gas turbine stator vane structure is constituted by connecting a plurality of C-shaped units 6 in a circle as shown in FIG. 8.

Fiber-reinforced prepregs composing the C-shaped core 7 and a resin composing the skin layer 8 may be the same as those of the I-shaped unit.

[3] Method for Producing Unit

Since the production steps of the I-shaped unit 2 and the C-shaped unit 6 are essentially the same, their explanations will be made only with respect to the I-shaped unit 2, taking carbon fiber-reinforced PEEK composed of carbon fibers aligned in one direction and impregnated with PEEK, for instance, without intention of restricting the scope of the present invention.

Carbon fiber-reinforced PEEK prepreg sheets are laminated such that carbon fibers are aligned along the longitudinal direction of the vane 13 (the radial direction of the stator vane structure), and the resultant laminate of carbon fiber-reinforced PEEK prepreg sheets is set in a die for forming an I-shaped core. The carbon fiber-reinforced PEEK laminate is then pressed while heating. A cavity of the die has a shape similar to the vane 13, about 0.1–2 mm smaller than the desired size of the vane 13. The die is heated at a temperature at which PEEK is fluidized by melting, preferably about 400° C. Forming pressure is preferably 3–25 kgf/cm², particularly about 15 kgf/cm².

The resultant I shaped core 3 is placed in an injection molding die. The same resin as the matrix resin of the I-shaped core 3, PEEK, is injected into gaps between the I-shaped core 3 and the die cavity to carry out a so-called insert molding. A shape of a cavity of the injection-molding die is the same as the final shape of the vane. By designing the cavity surfaces of the injection-molding die such that they are brought into full contact with part of the outside surfaces of the flanges 32 and 33, the resultant I-shaped unit 2 has the core 3 partially exposed from the skin layer 4 on both of an outside surface 21a of the outer platform piece 21 and an inside surface 22a of the inner platform piece 22.

The injection molding of PEEK are carried out preferably at an injection temperature of 360–420° C., for example, about 390° C., and an injection pressure of 500–2000 kgf/cm² at the site of a nozzle, for example, about 1800 kgf/cm². Thus, the thermoplastic resin skin layer 4 having a thickness of about 0.1–2 mm is formed around the core 3.

[4] Gas turbine Stator Vane Structure

The I-shaped units and the C-shaped units can be assembled to the gas turbine stator vane structure having the same constitution by the same method, regardless of their shapes. Thus, explanations will be made first on the I-shaped units.

Figure 9:
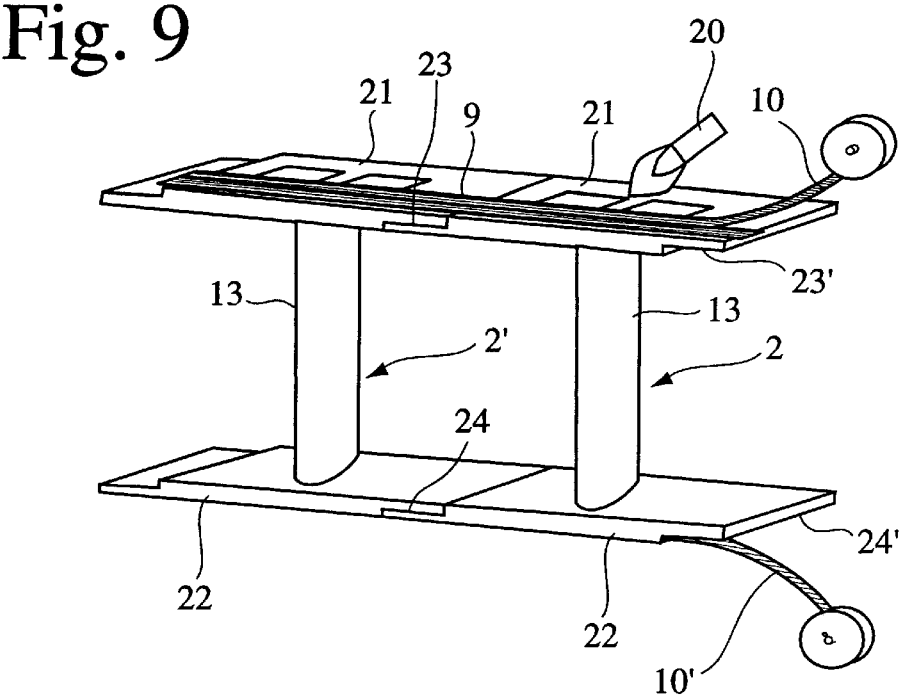
FIG. 9 is a perspective view showing the production of the gas turbine stator vane structure of the present invention from a plurality of I-shaped units.

The I-shaped units 2, 2' . . . are assembled in a circle as shown in FIG. 1 and fixed by a jig. The steps 23, 23' and 24, 24' of the adjacent units 2, 2' . . . are connected end to end by adhesives, ultrasonic welding, etc. FIG. 9 exemplifies the connection of two I-shaped units 2, 2', and such connection is carried out until the units form a circular structure. Though the platform pieces 21, 22 are depicted flat in FIG. 9, these pieces 21, 22 are actually arcuate.

As shown in FIGS. 1 and 9, tapes 10, 10' of the same fiber-reinforced resin, for example, a carbon fiber-reinforced PEEK, as that of the core 3 are fused to the assembled I-shaped units 2, 2' . . . while being wound around them on the outside surface 11a of the resultant outer platform 11 and on the inside surface 12a of the resultant inner platform 12. Each of the fused carbon fiber-reinforced PEEK tapes 10, 10' forms reinforcing coating layers 9, 9' on each of the outside and inside surfaces. The tapes 10, 10' may be fused by a torch 20, an electric iron, etc., at a temperature of about 350–450° C. The thickness of each reinforcing coating layer 9, 9' may be about 0.5–4 mm. The reinforcing coating layers 9, 9' are composed of the same material as the core 3. It is preferred that the core 3 is partially exposed through the windows of the skin layer 4, and that the reinforcing coating layers 9, 9' are directly fused to the platform pieces 21, 22 and the exposed core 3. In such case, all units 2 are strongly connected to each other, thereby providing the integrally formed gas turbine stator vane structure with a good mechanical strength.

Figure 10:
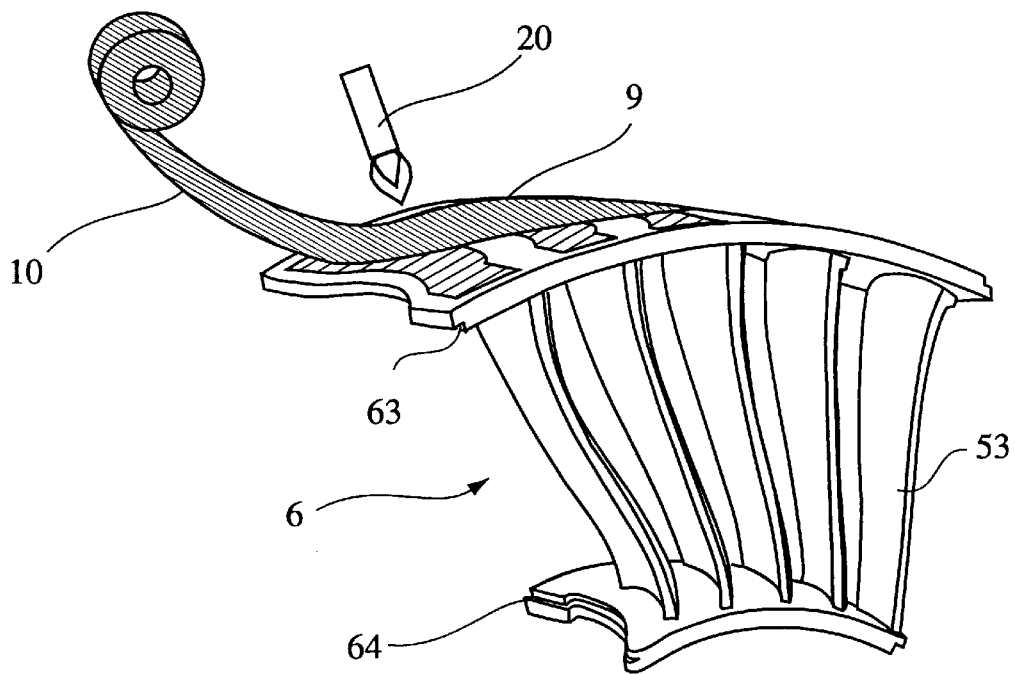
FIG. 10 is a perspective view showing the production of the gas turbine stator vane structure of the present invention from a plurality of C-shaped units.

As shown in FIG. 10, the gas turbine stator vane structure may be produced from the C-shaped units in the same manner as in the case of the I-shaped units. Namely, a plurality of C-shaped units are assembled in a circle, fixed by a jig, and connected end to end by adhesives, ultrasonic welding, etc., followed by fusing of fiber-reinforced resin tapes 10, 10' (only tape 10 is depicted) to the assembled C-shaped units while winding on both outside and inside surfaces to form reinforcing coating layers 9, 9' (only layer 9 is depicted). In contrast with the I-shaped unit, each C-shaped unit has a larger effective core exposure area that comes to contact with the fiber-reinforced prepreg tape 9, ensuring stronger connections of the C-shaped units. Thus, the C-shaped units are more effective for smaller stator vane structures than the I-shaped units.

In either of the I-shaped units and the C-shaped units, the outside surface of the outer platform and the inside surface of the inner platform may be fastened by a support ring, respectively. The support ring may be made of metals or plastics as long as it is an integral member. In a case where the gas turbine stator vane structure is fixed by the support ring, the units can easily be exchanged for repair.

The present invention has been described referring to the above embodiments, however, it is not restricted thereto and any modifications of the shapes of the units, materials, forming conditions, etc., may be made unless they deviate from the scope of the present invention defined in the claims attached hereto.

As described above, with units having an I-shape, C-shape, etc., of the present invention each comprising a core composed of fiber-reinforced prepregs and a skin layer integrally molded around the core by injection molding, strong connection of vanes to platforms is easily achieved. A gas turbine stator vane structure of the present invention is produced by assembling such units in a circle and integrally connecting the units by winding and fusing reinforcing tapes composed of the same fiber-reinforced prepregs as those of the core, around the outside and inside surfaces. Thus, the gas turbine stator vane structure constituted by strongly connected units has excellent mechanical strength.

Because the gas turbine stator vane structure of the present invention can be produced from units with simple structure without bolts, etc., great reduction can be achieved in the number of working steps and production costs. Also, because the units of the present invention are integrally molded around exactly the same shape by injection molding, the gas turbine stator vane structure of the present invention has extremely accurate dimensions. Additionally, because each unit of the present invention comprises the fiber-reinforced resin core and the thermoplastic resin skin layer, the gas turbine stator vane structure produced therefrom has remarkably reduced weight.

What is claimed is:

1. A unit for constituting a gas turbine stator vane structure comprising a plurality of vanes, an outer platform and an inner platform, said unit being constituted by (a) a core composed of a laminate of fiber-reinforced prepregs and integrally having a web for constituting a vane, and flanges integrally connected to both ends of said web for constituting outer and inner platform pieces; and (b) a skin layer integrally molded around said core, said skin layer having one or more windows for exposing said core at least partially on both of an outside surface of said outer platform piece and an inside surface of said inner platform piece.

2. The unit according to claim 1, wherein said flanges are formed by bending both ends of a laminate of fiber-reinforced prepregs.

3. The unit according to claim 3, wherein said flanges are formed by splitting both ends of a laminate of fiber-reinforced prepregs into two parts and bending the split ends in opposite directions in a T-shape manner, thereby providing said core with a substantially I-shape.

4. The unit according to claim 2, wherein said flanges are formed by bending both ends of a laminate of fiber-reinforced prepregs in one direction, thereby providing said core with a substantially C-shape.

5. The unit according to claim 1, wherein said core is composed of carbon fiber-reinforced polyetheretherketone.

6. The unit according to claim 1, having steps for connecting with those of the adjacent units at both circumferential ends of the outer and inner platform pieces, said steps of the adjacent units having complementary shapes.

7. A gas turbine stator vane structure comprising a plurality of vanes, an outer platform and an inner platform, and formed by integrally connecting a plurality of units in a circle with fiber-reinforced prepreg tapes each wound around and fused to an outside surface of said outer platform and an inside surface of said inner platform, each of said units being constituted by (a) a core composed of a laminate of fiber-reinforced prepregs and integrally having a web for constituting a vane, and flanges integrally connected to both ends of said web for constituting outer and inner platform pieces; and (b) a skin layer integrally molded around said core.

8. The gas turbine stator vane structure according to claim 7, wherein said core is at least partially exposed through windows of said skin layer on both of an outside surface of said outer platform piece and an inside surface of said inner platform piece, and fused to said fiber-reinforced prepreg tapes.

9. The gas turbine stator vane structure according to claim 7, wherein steps provided at both circumferential ends of said outer platform piece and said inner platform piece of said adjacent units are bonded to each other by adhesives or welding.

10. The gas turbine stator vane structure according to claim 7, further comprising a support ring for fixing an outside surface of said outer platform and an inside surface of said inner platform.

11. A unit for constituting a gas turbine stator vane structure comprising a plurality of vanes, an outer platform and an inner platform, said unit being constituted by (a) a core composed of a laminate of fiber-reinforced prepregs and integrally having a web for constituting a vane, and flanges integrally connected to both ends of said web for constituting outer and inner platform pieces; and (b) a thermoplastic resin skin layer integrally molded around said core, said thermoplastic resin skin layer having one or more windows for exposing said core at least partially on both of an outside surface of said outer platform piece and an inside surface of said inner platform piece.

* * * * *